United States Patent [19]
Sherman

[11] Patent Number: 5,891,546
[45] Date of Patent: Apr. 6, 1999

[54] AUXILIARY MOLDED FLOOR MATS

[76] Inventor: Raymond O. Sherman, 20A Club House La., Fairfield, Ohio 45014

[21] Appl. No.: 818,713

[22] Filed: Mar. 14, 1997

[51] Int. Cl.$^6$ ........................................................ B32B 3/02
[52] U.S. Cl. ................................ 428/88; 428/95; 428/99; 428/120; 428/192; 15/217; 296/97.23
[58] Field of Search ................................. 428/78, 88, 95, 428/192, 99, 120; 296/97.23; 15/217

[56] References Cited

U.S. PATENT DOCUMENTS

| | | | |
|---|---|---|---|
| 4,529,639 | 7/1985 | Peoples, Jr. et al. | 428/95 |
| 4,579,764 | 4/1986 | Peoples, Jr. et al. | 428/95 |
| 4,721,641 | 1/1988 | Bailey | 428/88 |
| 4,828,898 | 5/1989 | Bailey | 428/88 |
| 5,034,258 | 7/1991 | Grace | 428/78 |
| 5,362,544 | 11/1994 | Reuben | 428/88 |
| 5,474,829 | 12/1995 | Woosley | 296/97.23 |

*Primary Examiner*—Alexander Thomas
*Attorney, Agent, or Firm*—Charles R. Wilson

[57] ABSTRACT

An auxiliary molded floor mat is produced to fit the carpeted floor compartment area of a van, pickup truck, sport utility vehicle or other vehicle having a floor which is substantially flat and even with a door sill. The floor mat is a one piece composite of a tufted carpet layer, a thermoplastic mid-layer and a non-slip substrate bottom layer. The floor mat has a flat base with raised walls near each of its outside edges which form a tray-like central area. At least one of the raised walls is double walled with a substantially horizontally extending floor engaging peripheral lip. Molding of the composite imparts a desired contoured shape which neatly fits the vehicle's floor compartment area without substantial folds or wrinkles. The tray-like central area of the floor mat catches debris. It is readily cleaned simply by removing the full mat from the vehicle.

18 Claims, 5 Drawing Sheets

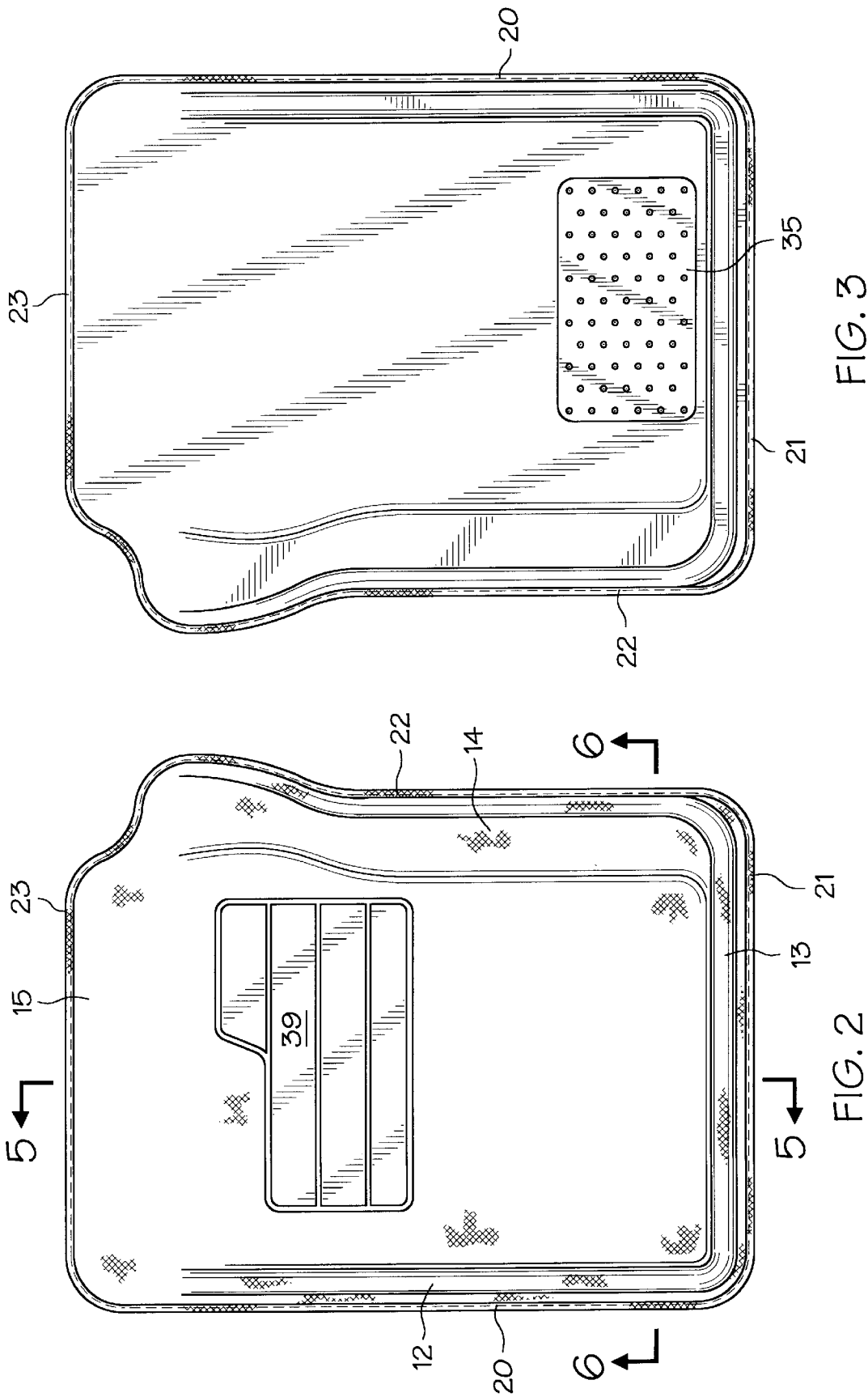

AUXILIARY MOLDED FLOOR MATS

This invention relates to floor mats. More particularly, the invention relates to auxiliary molded floor mats which are designed to overlie a carpeted floor area of a van, pickup truck, sport utility vehicle or other vehicle having a flat floor surface substantially even with a door sill.

Carpeting is now extensively used in vehicles of all types. Automobiles have long been built by the manufacturer with carpet. Other vehicles including vans, pickup trucks and sport utility vehicles typically now also come equipped with carpet in the driver and passenger areas as well as in a back cargo area. The carpeting is usually a high quality item designed to look and feel nice. The carpet must also be very durable, given its nature of use. The aesthetic and construction requirements of vehicle carpet necessitates relatively expensive raw goods in the original production of the carpet.

Adding to the expensive nature of the carpet is the fact it must be installed in a small but very irregular shaped area. Automobiles typically have a power train center hump extending along the interior floor area. Additionally, a front foot area is almost always sloped where a firewall is located. More abrupt direction changes occur at wheel well areas and side areas. Such irregular shapes are difficult to cover with a normally planar carpet material. Substantial cutting, piecing and sewing of the carpet has to be done, or in recent years, molding specially backed carpet to produce a carpet shaped to fit the surface it covers. Replacement of the original carpet is even more expensive due to the need to remove seats, etc.

For the above reasons, purchasers of new automobiles quite often buy auxiliary floor mats to cover at least the carpeted front floor area. Floor mats to cover the carpeted back seat floor and cargo compartment areas are also often purchased. The floor mat's primary purpose is to protect the underlying carpeted floor. However, the floor mat itself must look attractive. It is necessary that the floor mat neatly fit the surface area it covers. Folds, wrinkles and buckles in the mats are not tolerated. The floor surfaces of most automobiles built in recent years are three dimensional and in the form of a floor well. As a result, it is a relatively easy task to form auxiliary floor mats to fit the surface areas without particular concern with folds, etc. and without undue concern with mat movement.

Vans, pickup trucks and sport utility vehicles are becoming increasingly popular with the general driving public. They are no longer being used just for light commercial usage. As a result, their floors are also being carpeted. However, the floors of such vehicles do not typically have a floor well. The floors, other than at the firewall or center hump areas, are more flat and substantially even with an exterior door sill. Producing floor mats at a reasonable cost to neatly fit such a floor and capable of remaining in place, yet removable for cleaning purposes, has been difficult.

There has now been developed an auxiliary floor mat for van, pickup truck and sport utility vehicle use which fills a great need. In accord with the need, the floor mats of this invention are contoured to neatly fit any floor compartment area and are produced at an acceptable cost.

SUMMARY OF THE INVENTION

Molded floor mats are dimensioned to fit neatly into floor compartment areas of vans, pickup trucks, sport utility vehicles and vehicles with similarly configured floors. The floor mat has a flat base and four raised walls which form a tray-like central area to catch debris. A raised wall which is adjacent a door sill is double walled and has a substantially horizontally extending floor engaging peripheral lip. Other raised walls are either double walled with the floor engaging peripheral lip or are single wall with a peripheral lip which structurally blends with the vehicle's interior contour. The mat is a composite of a tufted carpet top layer, a moldable thermoplastic mid-layer and a non-slip substrate bottom layer. The use of the thermoplastic mid-layer allows the composite to be molded to a desired contoured shape which is maintained. The floor mat is contoured to fit the floor area without the formation of folds, wrinkles, buckles, etc.

BRIEF DESCRIPTION OF DRAWINGS

FIG. 2 is a top plan view of the auxiliary floor mat of FIG. 1.

FIG. 3 is a bottom plan view of the auxiliary floor mat of FIG. 1.

DETAILED DESCRIPTION OF THE INVENTION

The auxiliary floor mats of this invention are intended for use in the carpeted floor compartment areas of those vehicles having substantially flat floors which extend to the exterior at a door sill. These vehicles primarily include vans, pickup trucks and sport utility vehicles. Different makes and models of such vehicles have different shaped floor compartment areas. However, all lack a floor well and instead have a substantially flat floor which lies in substantially the same plane as a door sill.

The invention herein is described with reference to the drawings wherein a particular shaped floor mat intended for one commercially available pickup truck model is shown. It should be understood that other floor mats having similar contoured areas designed for use in other vehicles of the type envisioned in this invention are contemplated.

Figure 1:
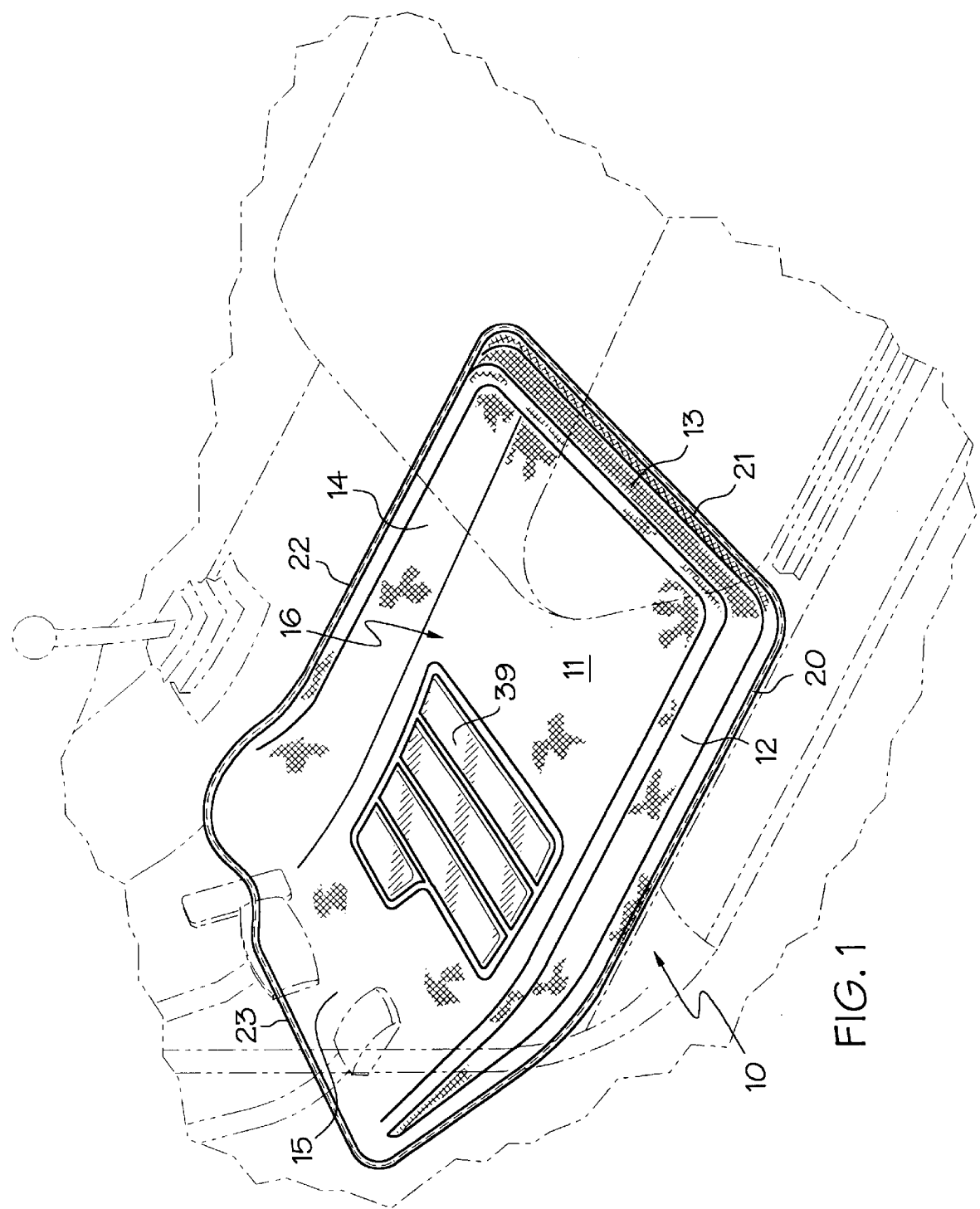
FIG. 1 is an environmental view showing an auxiliary floor mat of the invention in perspective.
Figure 4:
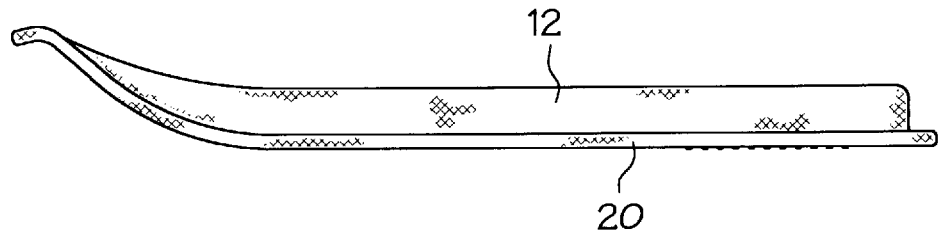
FIG. 4 is a side elevational view of the auxiliary floor mat of FIG. 1.

With reference to FIG. 1 there is shown an auxiliary floor mat 10. The floor mat has a substantially flat base 11 and raised walls 12, 13, 14 and 15 near outside edges of the flat base 11. The four walls form a tray-like central area 16 in the floor mat. The floor mat 10 has two peripheral lips near the raised walls 12 and 13 which are substantially flat and on the same plane as the flat base, while as further discussed below with reference to FIG. 9, some floor mats of the invention have all four peripheral lips near raised walls which are substantially flat.

The shape of the depicted floor mat 10 fits the profile of the driver's side of the pickup truck. As typical with current pickup trucks and as best seen in FIG. 1, the underlying carpeted floor surface is substantially flat and substantially even with the door sill. That is, there is no floor well as is typical with current automobiles. As a result, the auxiliary molded floor mat of the invention also has a substantially flat underside and at least one peripheral lip which makes contact with the substantially flat carpeted floor.

Figure 5:
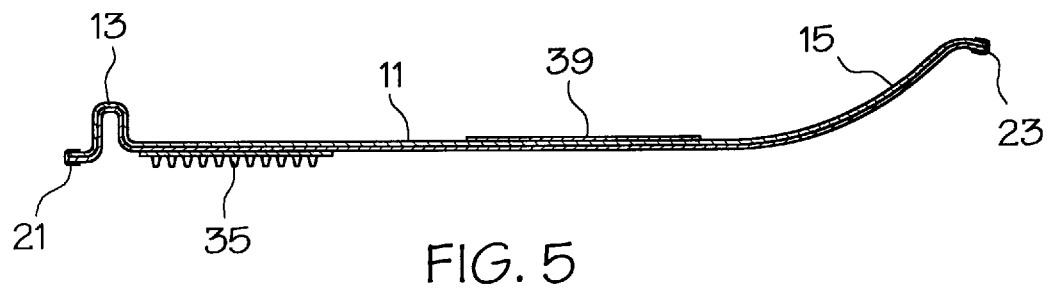
FIG. 5 is a sectional view of the auxiliary floor mat of the invention taken along line 5—5 of FIG. 2.
Figure 6:
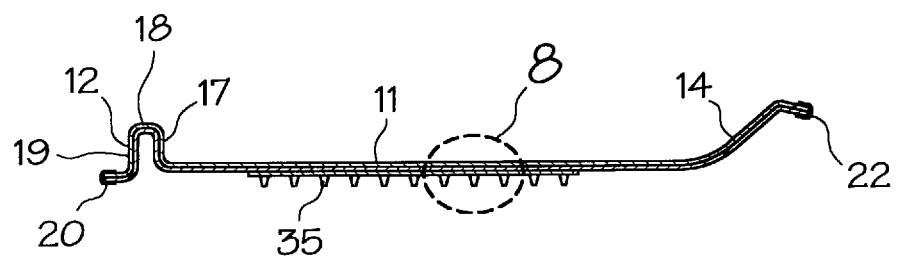
FIG. 6 is another sectional view of the auxiliary floor mat of the invention taken along line 6—6 of FIG. 2.

With reference to FIGS. 1 and 6, the first raised wall 12 of the floor mat 10 is substantially vertical. It is double walled with an inside wall 17 which extends substantially vertically from the flat base 11 up to about three inches, preferably about one inch to about two inches, a substantially horizontal top wall 18, and an outside wall 19 which extends substantially vertically down to the approximate same plane as the flat base 11. A floor engaging peripheral lip 20 extends substantially horizontally from the outside wall 19. Similarly, and with reference to FIG. 5, the second wall 13 which extends at an about right angle to the first wall 12 is also double walled with a substantially horizontally extending floor engaging peripheral lip 21. The peripheral lips 20 and 21 lie in substantially the same plane as the flat base 11 of the floor mat.

The third wall 14 of the floor mat 10 extends at an about right angle from the second wall 13 and runs in the same direction as the first wall. The third wall 14 of the floor mat 10 is intended to lie along the center hump of the pickup truck. Accordingly, as seen in FIG. 6, the third wall 14 extends vertically upwardly with a substantially horizontally extending peripheral lip 22. The lip 22 abuts against the center hump of the truck and is intended to structurally blend with it to present a smooth line of contact.

Extending at another about right angle from the third wall 14 of the floor mat 10 back towards the first wall 12 is the fourth wall 15. The fourth wall 15 slopes upwardly and away from the substantially flat base 11. It is angled to fit flush with the firewall of the pickup truck. As best seen in FIG. 5, a peripheral lip 23 extends substantially horizontally from the fourth wall to engage a surface of the firewall in a smooth continuous line.

As should be evident, the molded floor mat 10 conforms to the driver side front floor area of the pickup truck by abutting against the center hump and being flush with the firewall and by sitting flat at the door sill and the seat area opposite the firewall. The profile of the raised wall adjacent the door sill is low and as a result does not interfere with the driver getting into or out of the pickup truck.

The auxiliary floor mat 10 is a composite of one piece construction. That is, it is unitary in structure, there being no seams, overlapping edges or anything of this sort. As seen best in FIG. 8, the floor mat has two distinct layers. A tufted carpet 30 represents the top layer. The carpet 30 includes a backing 31 and pile yarns 32 which are secured to the backing and extend therefrom to form a pile surface on the carpet's top surface. The backing 31 is a woven or non-woven fibrous material. The pile yarns 32 can be made from natural or synthetic materials. Typically they are made from a synthetic material because such materials are more durable and clean better. Polyester, polypropylene, and nylon are examples of widely used pile yarn materials. The yarns are usually secured to the backing by a binder composition.

A thermoplastic material 33 represents the second layer and covers the underside of the carpet 30. The thermoplastic plastic provides a tough, elastic and non-tacky backing. Primarily, it imparts stiffness and moldability to the carpet so that the carpet can be molded to a desired deeply contoured shape and such shape be retained. Examples of suitable thermoplastics include polymers of ethylene and propylene, copolymers of ethylene with ethylenically unsaturated monomers, e.g. ethylenevinyl acetate, acrylates, polyvinyl chlorides and styrene-butadiene polymers. Preferably, as explained below, the thermoplastic material is capable of being softened at a temperature of from about 300 degrees F. to about 500 degrees F. to become readily moldable. The backing is applied to the carpet in any manner, e.g. by dispersion coating, extrusion coating, calendaring and lamination. Thermoplastic backed carpets of the nature described are commercially available in a range of colors and weights.

The auxiliary floor mat of the invention has a non-slip substrate to help retain it in position on the carpeted floor surface during use. The non-slip substrate is any material which has the capability of physically interacting with the vehicle's carpeted floor surface to create a sufficient resistance to lateral forces. At the same time, the interaction of the non-slip substrate with the vehicle's floor is not so strong that the mat cannot be periodically removed and cleaned or discarded. A foam material is one example of a suitable non-slip substrate. Synthetic foam sheets of a closed-cell or open-cell nature are capable of being adhered to the midlayer thermoplastic material and presenting an outer surface which has sufficient irregularities as to not slip. Preferably for cost and production reasons, the non-slip substrate is an open-cell polyester or polyether foam. An adhesive can be used to hold the non-slip substrate permanently to the thermoplastic layer. Normally though, softening of the thermoplastic material during a molding step is sufficient to present a tacky surface to which the foam adheres.

Other non-slip substrates can be used. For example, a flexible plastic layer with protrusions uniformly spaced over its bottom surface provides an excellent non-slip surface. The protrusions interact with the carpeted floor of the vehicle to prevent substantial lateral movement. However, the floor mat can be readily removed by simply lifting it in a vertical direction.

In accord with a preferred embodiment of this invention, the non-slip substrate is a discreet gripping plate permanently attached to the underside of the carpet's thermoplastic material component. The gripping plate is described in detail in U.S. Pat. No. 5,034,258, column 2, line 57 to column 4, line 27, the disclosure of which is hereby incorporated by reference.

Figure 7:
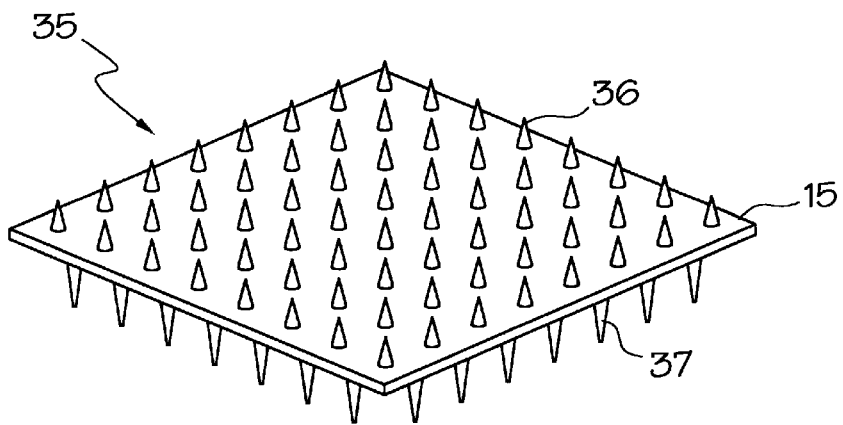
FIG. 7 is a perspective view of a non-slip gripper plate found on the auxiliary floor mat of FIG. 1.
Figure 8:
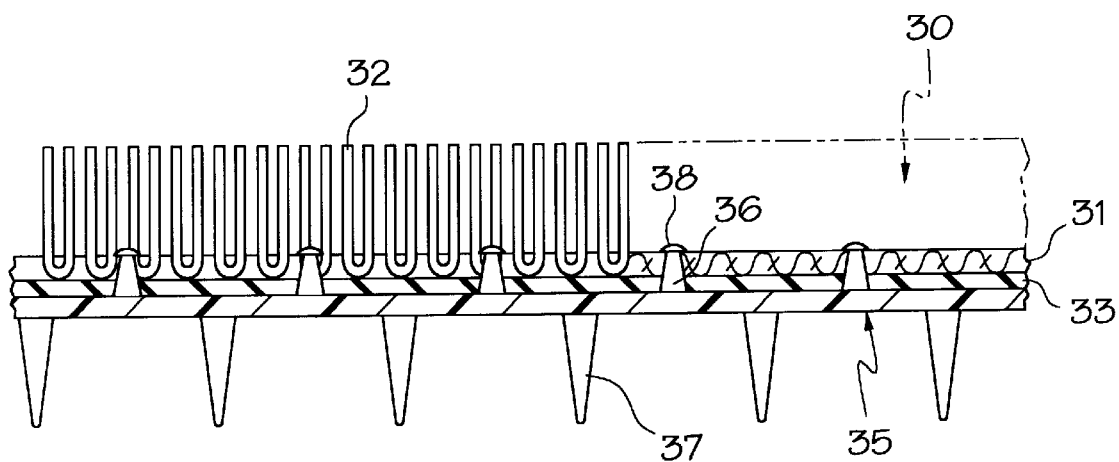
FIG. 8 is an enlarged side view in section taken along line 8—8 of FIG. 6 showing the non-slip gripping plate and its attachment to a bottom surface of the molded floor mat.

With reference to FIGS. 6, 7 and 8, the gripping plate 35 is a thin plate of a polymeric material having sets of vertically extending protrusions on each side. One set of protrusions 36 is used to permanently hold the gripping plate to the carpet component while the second set of protrusions 37 is used to hold the floor mat in position when placed on a carpeted floor. The size of the gripping plate is not critical. It can have a length and width sufficient to substantially cover the carpet component's underside. Maximum holding power would be attained in this instance, though is more than is needed under normal use circumstances.

Preferably, small carpet floor mats such as the mat 10 of FIG. 1 use a single gripping plate 35 ranging in size from about five inches to about ten inches in length and width and centrally placed near a back edge. Floor mats such as used on a back seat floor compartment or a cargo floor compartment will use a series of similarly shaped and dimensioned gripping plates placed strategically in the corners and/or along the edges of the mat's underside.

The first set of vertically extending protrusions 36 on the gripping plate 35 covers one surface. They are preferably uniformly spaced over the surface. After the gripping plate is positioned on the carpet component, a force is applied by a hydraulic press with force platens. As best seen in FIG. 8, the protrusions 36 are distorted at their tips 38 in a random fashion. Some of the protrusions are bent in essentially right angles to the base portions of the protrusions while other tips are "mushroomed". The random distortions of the tips are responsible for the permanent attachment of the gripping plate to the carpet component. The protrusion tips interlock with the component's fabric backing so that vertical as well as lateral forces in any direction will be resisted by several protrusion tips which are bent in the same direction as the force and thus are locked against a part of the fabric backing.

The second set of vertically extending protrusions 37 cover the opposite side of the gripping plate 35. They too, are preferably uniformly spaced over the surface. These protrusions are used to interact with the underlying carpet floor to prevent shifting of the mat when placed thereon.

Optionally, a heel pad is permanently positioned on the auxiliary molded floor mat to be used on the driver's side. A finished edging such as serging or stitched binding can also be provided for appearance purposes. Again, with reference to FIG. 1, a heel pad 39 is dimensioned and secured to the top surface of the carpet to cover an area where the driver's heel makes repeated contact while driving.

Figure 9:
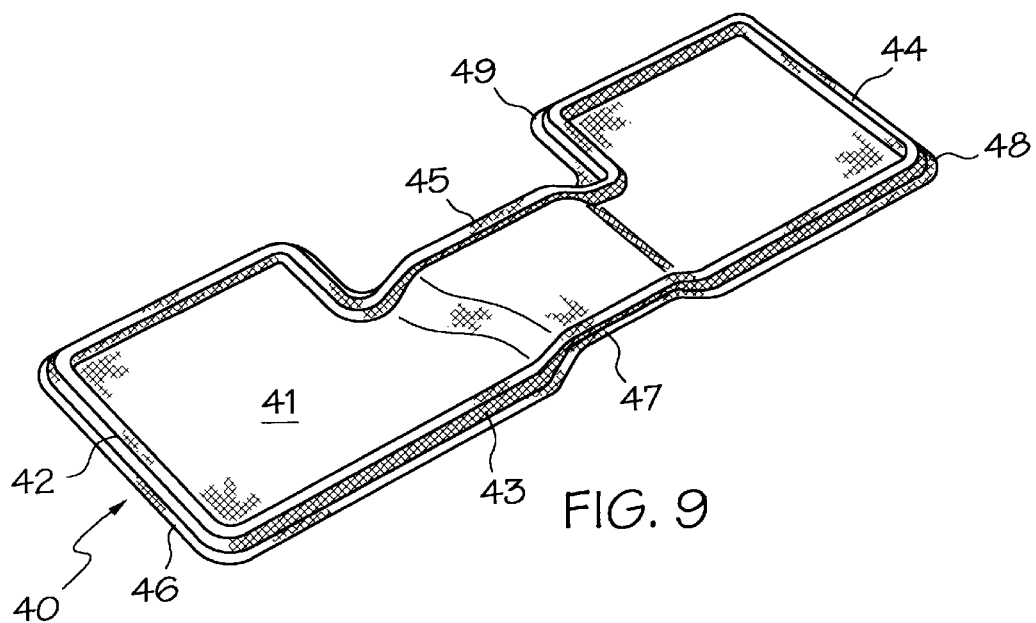
FIG. 9 is a perspective view of an auxiliary floor mat of the invention designed to fit onto a back seat carpeted floor of a vehicle.

The auxiliary molded floor mats of the invention are also useful in the back seat carpeted floor area and, when present, the carpeted floor cargo area of the van, pickup truck or sport utility vehicle. As seen in FIG. 9, the floor mat 40 has a profile to fit into the back floor area and over the center hump. A substantially flat base 41 has raised walls 42, 43, 44 and 45 near outside edges of the floor mat and extending substantially vertically from the flat base 41. Each raised wall is double walled similar in construction to the double walls 12 and 13 described above with reference to the floor mat of FIGS. 1–6. Further, each of the raised walls has a substantially horizontally extending floor engaging peripheral lip 46–49.

Figure 10:
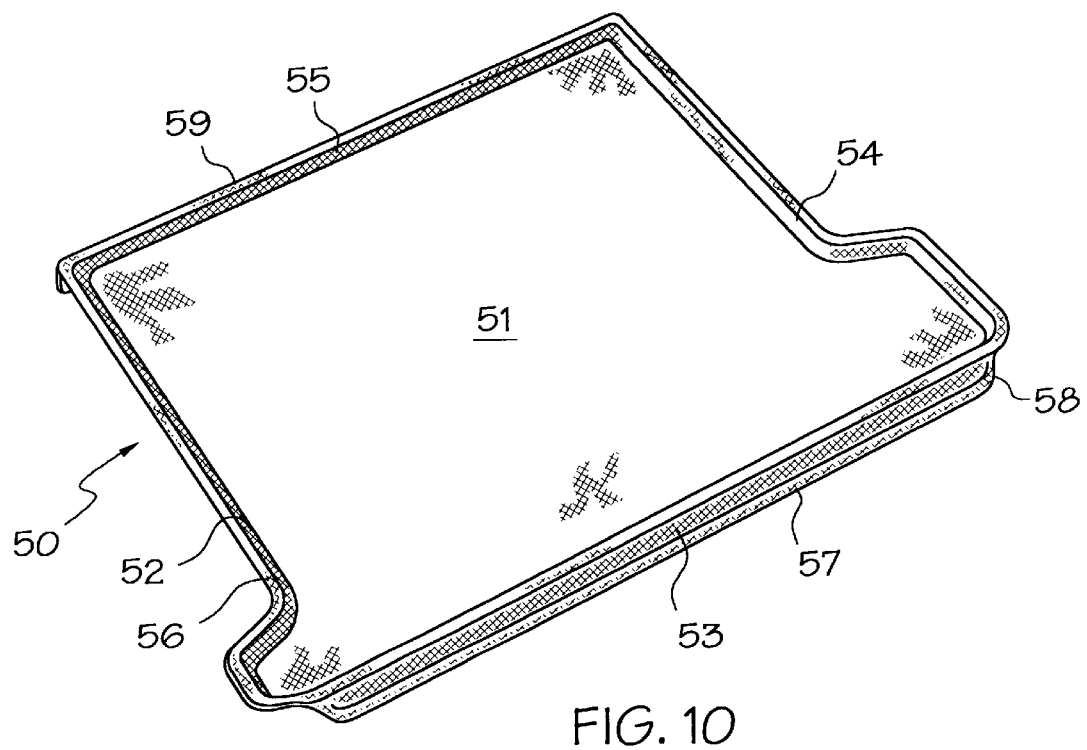
FIG. 10 is a perspective view of an auxiliary floor mat of the invention designed to fit onto a cargo carpeted floor of a vehicle.

As seen in FIG. 10, an auxiliary molded floor mat 50 has a profile to fit onto a carpeted floor of a cargo area. It has a flat base 51 and raised walls 52, 53, 54 and 55. The raised wall 53 adjacent a back door sill and the opposed raised wall 55 are double walled and each has a substantially horizontally extending floor engaging peripheral lip 57 and 59. The raised walls 53 and 55 and their peripheral lips 57 and 59 are similar in construction to those of the floor mat 10 described above. The raised walls 52 and 54 are single walls, each with a peripheral lip 56 and 58, respectively, which extends substantially horizontally to structurally blend into side walls of the vehicle's cargo area.

It should be understood the auxiliary floor mats of the invention all have at least one raised wall which is double walled with a substantially horizontally extending floor engaging peripheral lip. The raised wall which is double walled is always adjacent an exterior door sill in use. The other raised walls of the floor mat are either single wall with a peripheral lip which structurally blends into a center hump, firewall, seat structure, or side wall or are double walled with the floor engaging peripheral lip. The mats of the invention are custom made to conform with a particular vehicle's interior carpeted area. The use of the double wall or single wall construction is dictated by the intended vehicle's interior lay-out. In all instances, raised walls are present to create the tray-like central area.

The auxiliary floor mats of the invention are produced by a molding operation. U.S. Pat. No. 5,207,963 describes one very efficient carpet molding process, though other processes are usable. Male and female molds are initially made with profiles which match those of the portion of floor compartment area to be covered. Generally, a fiberglass reinforced resinous material is used to produce the mold, though other molds made of cast metal, e.g. aluminum can as well be used. A blank of the thermoplastic backed carpet and, in certain embodiments, a sheet of the non-slip material are cut to a size which is sufficient to result in a complete molded floor mat, yet with as little excess as possible. Obviously, any excess carpet and non-slip material must ultimately be trimmed off the molded floor mat and discarded as waste.

The carpet blank is positioned in a heat zone to heat its thermoplastic backing. A convection oven can be used, though this phase of the molding operation is more practically done using a bank of heaters which directs its heat to the thermoplastic backing. For example, quartz heaters are able to quickly heat the plastic to the required softening point without adversely affecting the yarn piles. The amount of heat and dwell time in the heat zone will depend on the particular plastic backing and its thickness. Normally, sufficient heat is applied until a 300 degrees F. to 500 degrees F. surface temperature is reached.

The heated carpet blank is then promptly transported to the aforementioned molds. The heated blank can be manually transported to the molds and manually suspended therebetween. A more efficient process results when the heated carpet blank is suspended in an open rack by clamp means. The rack is used for moving and holding the heated blank. The heated carpet blank and non-slip substrate are suspended between the molds and together molded to the shape of the molds when they are closed under pneumatic pressure. The molds are held together to impart the desired configuration to the composite. The molds are allowed to cool either by loss of heat to the surroundings or circulation of a coolant in the molds. The cooling has the effect of allowing the thermoplastic backing to reharden in the molds. Eventually, the molds are opened and the molded floor mat removed. Excess material is trimmed from the floor mat's edges either while still in the molds or after removed.

The resultant molded floor mat is a dimensionally stable article having a desired contoured shape. As should be evident, the floor mat is a one piece construction. No seams, overlap areas, etc. appear in the article. Most importantly a high quality floor mat is efficiently produced. The floor mat fits onto the carpeted floor compartment areas of the van, pickup truck or sport utility vehicle with no substantial folds or wrinkles.

In use, the auxiliary molded floor mat is simply positioned on the carpeted floor to be protected. When the preferred floor mat is used, a slight downward pressure is exerted to cause the protrusions on the underside of the gripping plate to interact with the carpeted floor. The floor mat will remain in place under normal use. The gripping plate remains permanently attached to the carpet component due to the first set of vertically extending protrusions and remains in place on the carpeted floor due to the second set of vertically extending protrusions. The tray-like central area of the mat catches debris and holds it within its confines. Most importantly, the debris remains in the tray-like central area, including when the floor mat is removed from the vehicle for cleaning purposes. In due course, the floor mat is readily removed from the vehicle simply by lifting it vertically from the carpeted floor. Once cleaned, the mat is reinstalled.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

What is claimed is:

1. A molded floor mat for positioning in a carpeted floor compartment area of a vehicle to catch debris and for temporary removal from the vehicle to extract the debris, said floor mat having a tray-like central area and being contoured to neatly conform to the carpeted floor compartment area, further said floor mat having a flat base with a first raised wall which is double walled with a substantially horizontally extending floor engaging peripheral lip which lies in substantially the same plane as the flat base, a second raised wall, a third raised wall and a fourth raised wall, each of said first, second, third and fourth raised walls being at about right angles to one another thereby forming the tray-like central area.

2. The molded floor mat of claim 1 wherein the first raised wall comprises an inside wall which extends substantially vertically upwardly from the flat base, a top wall which extends substantially horizontally from the inside wall and an outside wall which extends substantially vertically downwardly from the top wall and the peripheral lip extends from the outside wall.

3. The molded floor mat of claim 2 wherein the inside and outside walls of the first raised wall are up to about three inches in height.

4. The molded floor mat of claim 3 wherein the inside and outside walls of the first raised wall are each from about one inch to about two inches in height.

5. The molded floor mat of claim 1 being a one piece composite of a tufted carpet top layer having a backing and pile yarns secured thereto, an underlying moldable thermoplastic layer covering the tufted carpet top layer backing to maintain the molded floor mat in a contoured shape and a non-slip substrate bottom layer at least partially covering the thermoplastic layer.

6. The molded floor mat of claim 5 wherein the non-slip substrate is a synthetic foam.

7. The molded floor mat of claim 6 wherein the non-slip substrate is a gripping plate with spaced protrusions extending from its underside for interaction with the carpeted floor compartment area.

8. The molded floor mat of claim 7 further wherein the gripping plate has spaced protrusions extending from its upperside for interaction with the tufted carpet top layer.

9. The molded floor mat of claim 1 wherein the floor mat is intended for use in a front seat carpeted floor compartment area of the vehicle and wherein the second raised wall is double walled with a substantially horizontally extending floor engaging peripheral lip, the third raised wall further has a substantially horizontally extending peripheral lip for abutting against a center hump of the vehicle and the fourth raised wall slopes upwardly from the flat base and has a peripheral lip for engaging a firewall of the vehicle.

10. The molded floor mat of claim 9 further having a plastic heel pad on its top surface.

11. The molded floor mat of claim 1 wherein the floor mat is intended for use in a back seat carpeted floor compartment of the vehicle and the second raised wall, the third raised wall and the fourth raised wall are each double walled with a substantially horizontally extending floor engaging peripheral lip.

12. The molded floor mat of claim 1 wherein the peripheral lip of the first raised wall has a finished edging and further the second raised wall, third raised wall and fourth raised wall each has a peripheral lip which has a finished edging.

13. A molded floor mat for positioning in a carpeted floor compartment area of a vehicle to catch debris and for temporary removal from the vehicle to extract the debris, said floor mat being contoured to neatly conform to the carpeted floor compartment area, further said floor mat having a flat base with a first raised wall, a second raised wall, a third raised wall and a fourth raised wall near edges of the flat base to form a tray-like central area and wherein at least one raised wall is double walled with a substantially horizontally extending floor engaging peripheral lip which lies in substantially the same plane as the flat base.

14. The molded floor mat of claim 13 wherein each of said first, second, third and fourth raised wall are at about right angles to one another thereby forming the tray-like central area.

15. The molded floor mat of claim 14 wherein the first raised wall comprises an inside wall which extends substantially vertically upwardly from the flat base, a top wall which extends substantially horizontally from the inside wall and an outside wall which extends substantially vertically downwardly from the top wall and the peripheral lip extends from the outside wall.

16. The molded floor mat of claim 15 wherein the inside and outside walls of the first raised wall are each from about one inch to about two inches in height.

17. The molded floor mat of claim 13 being a one piece composite of a tufted carpet top layer having a backing and pile yarns secured thereto, an underlying moldable thermoplastic layer covering the tufted carpet top layer backing to maintain the molded floor mat in a contoured shape and a non-slip substrate bottom layer at least partially covering the thermoplastic layer.

18. The molded floor mat of claim 13 wherein the peripheral lip of the at least one raised wall has a finished edging and further each of the other raised walls has a peripheral lip which has a finished edging.

* * * * *